United States Patent Office 2,891,973
Patented June 23, 1959

2,891,973
NEW STEROID DERIVATIVE AND METHOD OF PREPARING SAME

Georges Muller, Nogent-sur-Marne, and Leon Velluz, Paris, France, assignors to Les Laboratoires Français de Chimiothérapie, Paris, France, a body corporate of France No Drawing. Application November 20, 1956
Serial No. 623,296

Claims priority, application France December 6, 1955

1 Claim. (Cl. 260—397.4)

The present invention relates to 19-nortestosterone hexahydrobenzoate and to the method of preparing the same.

The importance of the angular methyl group at the 19-position of non-aromatic steroid hormones is well known. It is also known that the removal of this angular methyl group by aromatization of the A ring followed by partial reduction leads to substantial changes of the physiological activity of the products treated in this manner. For example, 19-nor-testosterone possesses a high anti-folliculin activity with a greatly reduced virilizing activity in comparison to that of testosterone. This important property permits the prolonged use of the compound in women, for example, in treating syndromes of hyperfolliculinaemia, without any danger of causing virilism.

Since 19-nor-testosterone is not as readily available as testosterone, it would be highly desirable to obtain a similarly active product which could be administered at smaller and more widely spaced doses so as to compensate for the difficulties in preparation by using proportionally less thereof. These applicants have found that 19-nor-testosterone hexahydrobenzoate fulfills these conditions, since it has not only a delayed action, but constitutes a product having particularly favorable properties.

It is, therefore, one object of the present invention to provide a method of producing 19-nor-testosterone hexahydrobenzoate.

This and other objects and advantages of this invention will appear more clearly from the herein following detailed description and from the claims.

The process of preparing 19-nor-testosterone hexahydrobenzoate according to the invention consists in reacting, in the presence of a suitable condensing agent, a hexahydrobenzoyl halide with a solution of 19-nor-testosterone and isolating the 19-nor-testosterone hexahydrobenzoate obtained in this manner by centrifuging or filtering.

A preferred method of carrying out the process of the invention consists in operating in a solvent which also acts as condensing agent. This permits to react a hexahydrobenzoyl halide with 19-nor-testosterone in the presence of a tertiary base such as pyridine, which acts by fixing the hydracide that develops. This operation is carried out at a temperature between 0° C. and the refluxing temperature of the solvent used, but preferably at about room temperature. Upon completion of the reaction, the resulting product is extracted and washed to eliminate the condensing agent, and the 19-nor-testosterone hexahydrobenzoate is recovered by centrifuging, filtering or evaporating to dryness.

The 19-nor-testosterone used for the process of the invention may be prepared, for example, according to Wilds and Nelson (J. Am. Chem. Soc., 1953, 75, 5366), by reducing the 3-methyl ether of estradiol, followed by a hydrolysis of the resulting 3-methyl ether of 1,4-di-hydro 3,17β-estradiol.

The following example is presented to illustrate the present invention, without intent however to thereby limit the scope of the appended claims.

EXAMPLE

Preparation of 19-nor-testosterone hexahydrobenzoate 3 g. of 19-nor-testosterone prepared according to Wilds and Nelson (J. Am. Chem. Soc., 1953, 75, 5366) are dissolved in 30 cc. of anhydrous pyridine, 3 cc. of hexahydrobenzoyl chloride are added, and the solution is left undisturbed for sixteen hours at room temperature. The reaction mixture is taken up with 150 cc. of chloroform, washed with water, normal hydrochloric acid, sodium bicarbonate and again with water, and is then dried over magnesium sulfate and vacuum evaporated to dryness. The residue is taken up with 100 cc. of petroleum ether (boiling point: 40–50° C.) and the solution obtained in this manner is filtered, concentrated to a small volume and left in the refrigerator for three hours. After separation and drying in vacuo, 2.8 g. (67%) of 19-nor-testosterone hexahydrobenzoate are obtained, having a melting point of 88–89° C., $[\alpha]_D^{20} = +50° \pm 5$ (c.=0.5%, chloroform). The mother liquor left after crystallization produces, upon refrigeration, another 0.95 g. (23%) of the product. This new 19-nor-testosterone hexahydrobenzoate appears in the form of small, elongated prisms that are insoluble in water, but are soluble in organic solvents.

Analysis: $C_{25}H_{36}O_3 = 384.5$—
  Calculated: 78.1% C; 9.4% H.
  Found: 77.9% C; 9.3% H.

We claim:
The process of producing 19-nor-testosterone hexahydrobenzoate consisting in dissolving 19-nor-testosterone in anhydrous pyridine, adding hexahydrobenzoylchloride at room temperature to the resulting solution, allowing the mixture to stand at room temperature until esterification is completed, extracting the reaction mixture with chloroform, washing the chloroform extract with water, N hydrochloric acid, sodium bicarbonate solution, and water, drying the washed extract, evaporating the extract to dryness in a vacuum, dissolving the evaporation residue in petroleum ether, filtering off undissolved, concentrating the solution by evaporation, allowing the highly concentrated solution to crystallize at refrigerator temperature, and filtering off the crystals of 19-nor-testosterone hexahydrobenzoate.

References Cited in the file of this patent

UNITED STATES PATENTS 2,785,189    Hicks _____ Mar. 12, 1957